United States Patent
Kesper

(10) Patent No.: US 11,322,789 B2
(45) Date of Patent: May 3, 2022

(54) BATTERY BOX FOR A BLOCK BATTERY

(71) Applicant: HOPPECKE BATTERIEN GMBH & CO. KG, Brilon (DE)

(72) Inventor: Heinrich Kesper, Willingen (DE)

(73) Assignee: HOPPECKE BATTERIEN GMBH & CO. KG, Brilon (DE)

( * ) Notice: Subject to any disclaimer, the term of this patent is extended or adjusted under 35 U.S.C. 154(b) by 113 days.

(21) Appl. No.: 16/763,795

(22) PCT Filed: Nov. 15, 2017

(86) PCT No.: PCT/EP2017/079326
§ 371 (c)(1),
(2) Date: May 13, 2020

(87) PCT Pub. No.: WO2019/096377
PCT Pub. Date: May 23, 2019

(65) Prior Publication Data
US 2020/0358056 A1 Nov. 12, 2020

(51) Int. Cl.
*H01M 50/112* (2021.01)
*H01M 50/20* (2021.01)
*H01M 50/121* (2021.01)
*H01M 50/119* (2021.01)

(52) U.S. Cl.
CPC ........ *H01M 50/112* (2021.01); *H01M 50/119* (2021.01); *H01M 50/121* (2021.01); *H01M 50/20* (2021.01)

(58) Field of Classification Search
None
See application file for complete search history.

(56) References Cited

U.S. PATENT DOCUMENTS

| | | | |
|---|---|---|---|
| 9,559,340 | B2 | 1/2017 | Fink |
| 2010/0055556 | A1* | 3/2010 | Meschter ............. H01M 50/20 |
| | | | 429/159 |
| 2014/0199574 | A1 | 7/2014 | Fink |

FOREIGN PATENT DOCUMENTS

| | | |
|---|---|---|
| DE | 10 2011 077349 A1 | 12/2012 |
| EP | 3 059 777 B1 | 8/2017 |
| GB | 1 371 879 A | 10/1974 |
| GB | 2 125 611 A | 3/1984 |
| JP | S58 8864 U | 1/1983 |
| JP | S6238306 Y2 | 9/1987 |
| JP | H02306533 A | 12/1990 |
| JP | 08273638 A * | 10/1996 |

* cited by examiner

*Primary Examiner* — Gregg Cantelmo

(57) ABSTRACT

The aim of the disclosure is to improve a battery box to the extent that, when manufactured and used in a simple manner, the performance of the battery is ensured also over a longer period of time and responses can be made to modifications to the box, to the pressures prevailing in the box, etc. This aim is achieved, according to the disclosure, by a battery box, for a block battery, for receiving at least one battery cell having an electrode plate, said battery box comprising a main body, which is made of plastics material and has two end walls, which extend substantially in parallel with the electrode plates, and two side walls, which extend substantially at a right angle to said end walls, the end walls and side walls each having a top edge and a bottom edge and being interconnected so as to form a corner edge and the side walls having on the outer faces thereof a fastening edge extending at an angle to the corner edge.

6 Claims, 2 Drawing Sheets

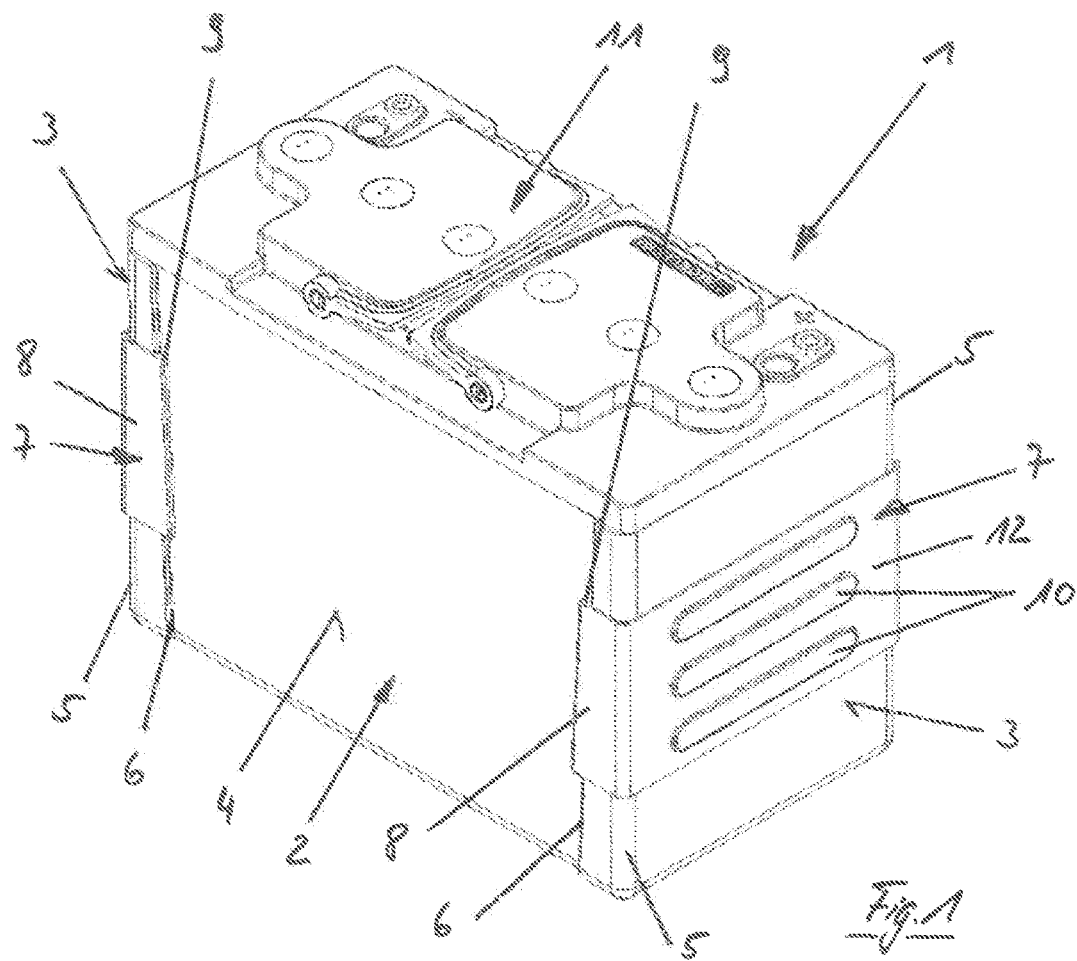
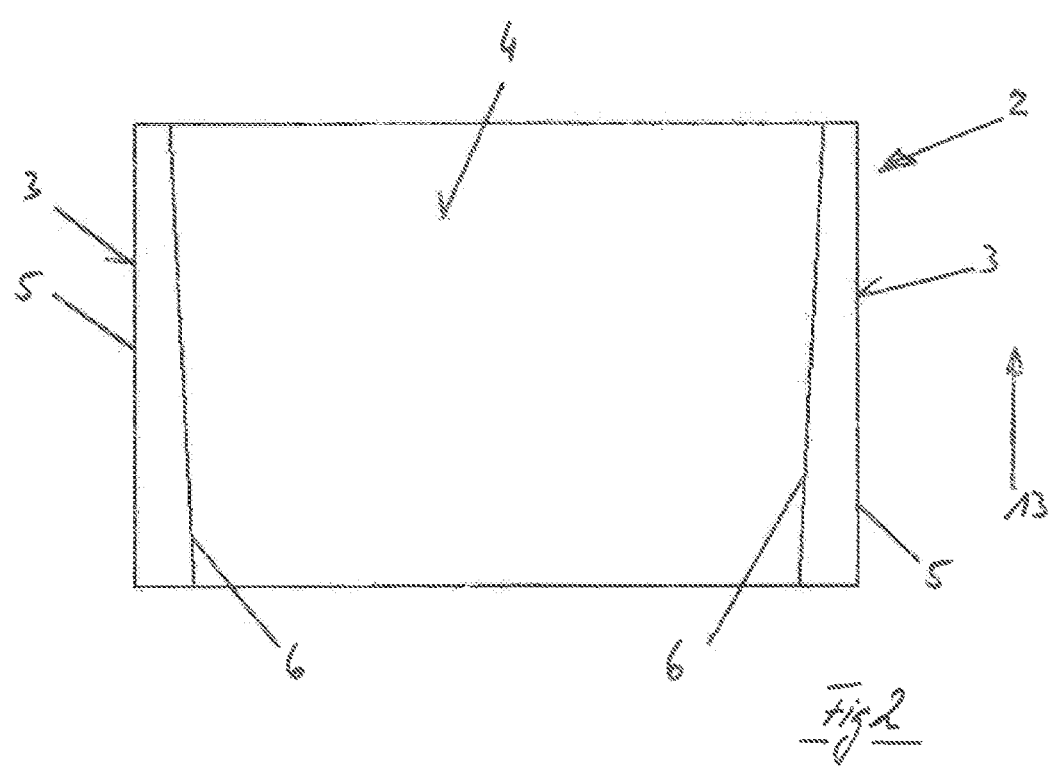

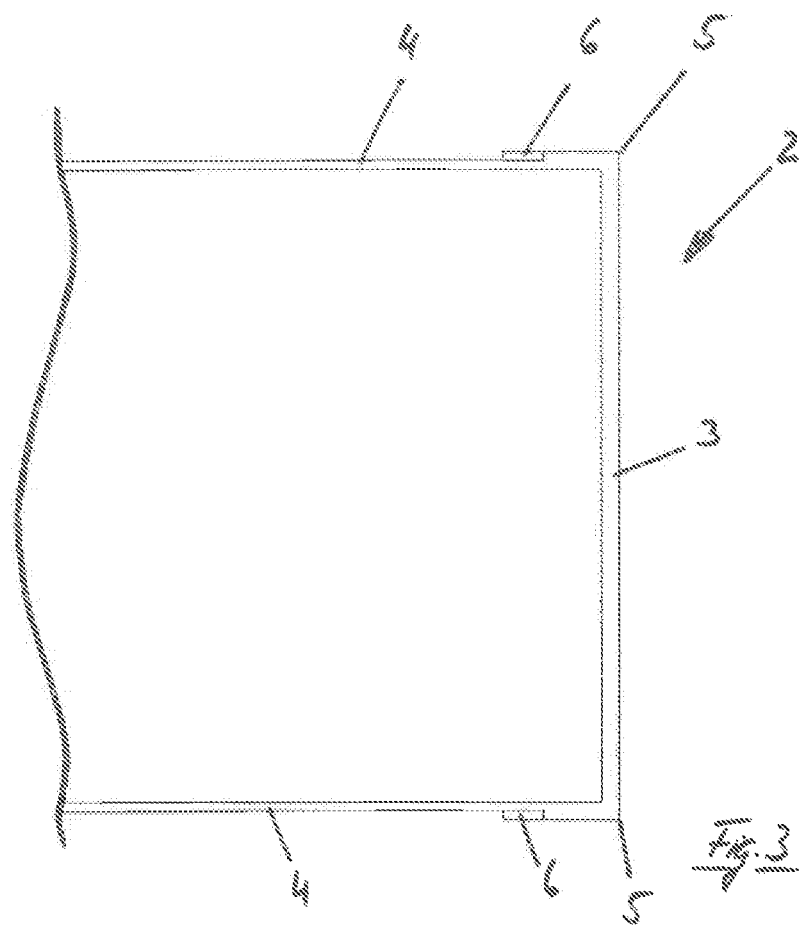
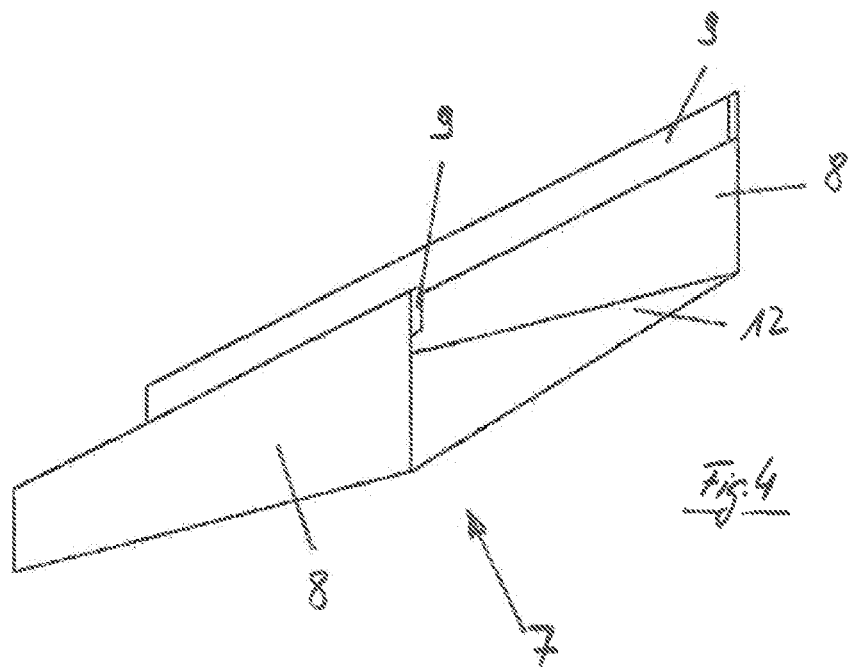

BATTERY BOX FOR A BLOCK BATTERY

CROSS-REFERENCE TO RELATED APPLICATIONS

This application is a National Phase of International Application No. PCT/EP2017/079326 filed on Nov. 15, 2017. The entire disclosure of the above application is incorporated herein by reference.

FIELD

The disclosure relates to a battery box for a block battery for receiving at least one battery cell having electrode plates, said battery box comprising a base body which is made of plastic material and has two end walls which extend substantially in parallel with the electrode plates, and two side walls which extend substantially at a right angle to said end walls, the end walls and side walls each having a top edge and a bottom edge and being interconnected so as to form a corner edge.

BACKGROUND

This section provides background information related to the present disclosure which is not necessarily prior art.

Batteries in general and block batteries in particular on the one hand and battery boxes for batteries, in particular block batteries, on the other hand, have been well-known per se from the prior art, which is why there is no need for separate printed proof in this place.

Battery boxes for a block battery known from the prior art comprise a base body made of plastic material. This base body provides a volume space which serves to receive a battery cell when used appropriately. Batteries having a plurality of cells comprise a battery box the volume space of which is subdivided into a corresponding number of compartments by means of partitions, wherein each compartment serves to receive one battery cell.

Typically, the battery box has a rectangular shape and comprises two end walls, two side walls, and a bottom. The side walls and the end walls are interconnected so as to form corner edges. When used, the battery box is usually not closed on the upper side, i. e. on the side opposite the bottom. Alternatively, however, it may be provided that the battery box is closed by a cover on the upper side.

The base body of the battery box is made of plastic material, wherein preferably polypropylene or acrylonitrile butadiene styrene (ABS) are used.

The battery cells of a block battery are formed by electrode plates arranged separately from one other, wherein either each of the negative or of the positive electrode plates are surrounded by a micro-glass fleece. This fleece preferably also serves as a separator. The object and purpose of this micro-glass fleece is to store electrolyte. The electrode plates are therefore not standing in the electrolyte, but they are surrounded by a fleece soaked with electrolyte, which entails the advantage that the block battery designed in this way can be used independent of its position, i. e. also lying on the side.

In order to ensure that there is always a good contact between the electrode plates, on the one hand, and the fleece soaked with electrolyte, on the other hand, the plate packs of individual battery cells are under a certain preload so that the electrode plates are pressed against each other. This is achieved in that the prefabricated cell pack is compressed and, in this compressed condition, inserted into the battery box serving as a battery housing or into the corresponding compartment. The boundary walls on the front face ends, i. e. the end walls of the battery box aligned in parallel with the electrode plates, keep the previously compressed cell pack in shape, providing abutments for the cell pack, so that an expansion of the cell pack is prevented with the result that a secure and permanently tight contact between the electrode plates and the fleece surrounding the electrode plates is ensured.

Plastic as such, and accordingly also polypropylene and ABS have the disadvantage that it loses its rigidity both with increasing temperature and with increasing service life. A combination of temperature and service life only increases this effect. Moreover, in particular with batteries, in the event of incorrect operation of the battery, for instance during charging, excess pressure may occur within the battery box, as a result of which an additional load is exerted on the battery box.

The end walls of the battery box which are under the action of force will buckle over time. This is due to the fact that the plastic material from which the battery box is made loses its rigidity as a result of advanced age and/or temperature effects and/or excess pressure in the battery box. This disadvantageously leads to a decrease of the contact pressure on the individual battery cells, and therefore on the individual electrode plates of a battery cell, which results in a loosening of the actually desired close contact between the electrode plates on the one hand and the fleece surrounding the electrode plates, on the other hand.

The close bearing of the fleece against the electrode plates, however, ensures that the electrolyte transport can be performed. In addition, this ensures that in the event of discharge, any released hydrogen and oxygen can be recombined internally. The active masses held by the electrode plates are retained, i. e. fixed in place, so that these can fall out also when the plates are working. These effects associated with the close bearing of the fleece against the electrode plates are impaired or even lost if the end walls of the battery box are buckled. As a result, the performance of the battery decreases in a disadvantageous manner.

In order to prevent such buckling as far as possible, it is known from JP H08 273638 A to equip the end walls of the battery box with a respective stiffening element. Such a stiffening element is U-shaped, wherein each of the U-legs has recesses through which projections on the battery box side reach.

A comparable construction is known from JP H02 306533 A, wherein according to this embodiment, it is preferred to arrange a stiffening element on the inside of the battery box.

JP S62 38306 Y2 finally shows another stiffening element which in finally assembled condition engages behind vertical ribs formed on the battery box.

From EP 3 059 777 B1, a battery box for a block battery of the generic type is known, wherein each of the end walls is stiffened, for which purpose one U-shaped stiffening element per end wall is provided, wherein each of the U-legs supports itself against a side wall adjoining the associated end wall, which stiffening element is fully inserted into a recess provided by the base body and at least partially encapsulated by the plastic material of the base body and embedded in the base body. Moreover, the stiffening element is positively fixed with respect to the respective end wall and the side walls adjoining thereto, for which purpose the stiffening element comprises through-holes. Furthermore, an additional stiffening of the stiffening element is provided, for which purpose the stiffening element has beads.

The previously known solutions are complex in terms of production and permit only a single arrangement of the stiffening elements which is stationary in relation to the battery box, without the possibility to react to changes in operation.

SUMMARY

This section provides a general summary of the disclosure, and is not a comprehensive disclosure of its full scope or all of its features.

Based on the above, it is the object of the disclosure to improve a battery box of the type mentioned in the beginning to the effect that with simple manufacture and application, the performance of the battery is ensured also over a longer period of time, and it is possible to react to changes of the box, the pressures prevailing in the box, etc.

In order to achieve this object, the disclosure proposes a battery box with the features of patent claim 1. Other advantages and features of the disclosure result from the sub-claims.

With the disclosure, as in the prior the art, it is provided to stiffen the end walls. In this manner, buckling is inhibited, ensuring as a result that the desired close contact between the electrode plates of a battery cell and a fleece surrounding the electrode plates is maintained, and this permanently.

According to the disclosure it is provided that fastening edges are formed on the outer surfaces of the side walls, which fastening edges extend at an angle to the respective corner edge. Such a design of the battery box makes it possible to use these fastening edges extending at an angle to arrange stiffening elements, on the one hand, and on the other hand, they make it possible to readjust the stiffening elements correspondingly.

Advantageously, the fastening edges are formed such that, viewed from the corner edges, they can be engaged behind. To that extent, brackets or clamps may be arranged which project from one side wall over the intermediate end wall to the other side wall and are each fastened to the fastening edges. Due to the extension at an angle with respect to the corner edge, there is an area where the fastening brackets or fastening clamps can be attached, so that with continuous displacement, a bracing is automatically achieved.

Accordingly, a fastening edge may extend in an inclined manner from the top edge to the bottom edge of a side wall. For the purposes of the present disclosure, this does not mean that they must begin or end in the area of the top or bottom edges. They may also begin and end at a distance from the respective edge. The fastening edge may be formed by an edge provided by the side wall material, for instance by a design of the side wall material providing an edge by a projection, a groove, and/or the like. It may also be formed, however, by applying a web element or for instance a moulded plate which is applied centrally on a side wall element and has lateral edges set on edge. For the purposes of the disclosure, the respective fastening edges provide areas which can be engaged behind from the corner edge. They may be straight or provided with a negative camber or even have an engagement groove. Thus, fixation means of any kind may be used, if required, for instance screws, pegs, etc., in order to secure the clamping element in the area of the fastening groove. In particular the use of moulded plates makes it possible to retrofit older boxes. In summary, the embodiment according to the disclosure is suitable for replacing clamping elements which are damaged or too weak.

For the purposes of the present disclosure, a clamping element may be arranged on the battery box in such a way that one area of it rests against an end wall. Integrally formed on both sides, the clamping element comprises areas which rest against the respective side wall adjoining the end wall. These areas have free ends and are chamfered in such a way that the folded edges can engage behind the fastening edges. Also multiple edges for engaging in grooves or folded edges exceeding 90° for engaging in bevelled fastening edges are within the scope of the disclosure.

According to an advantageous proposal, the clamping element is made of metal. Moreover, according to another advantageous proposal of the disclosure, the clamping element may comprise stiffening ribs. These may be embossings, folded edges, feather edges, beads, and the like.

The free ends of the clamping elements are bevelled, so that they extend in the same manner as the fastening edges. So if a clamping element is attached to the battery box, the clamping element can be pushed onto the battery box with the inclined free edge until the free edges rest against the fastening edge of the side walls over their entire length.

Thanks to movements during operation, the clamping elements will always be shaken firmly into place. Moreover, they can be forced on further in the event of changes of pressure.

The battery boxes proposed by the disclosure can be manufactured with little economic effort. The same applies to the clamping elements. According to the disclosure, the arrangement of the clamping elements on the battery boxes is considerably simplified and improved, it is even possible to detach them or to subsequently fix them further.

Overall, the advantage achieved by the construction according to the disclosure is that it permits simple assembly. The clamping element, also called stiffening plate, can either be clipped onto the fastening edges provided by the battery box or pushed from above along the fastening edges to its end position. By such pushing in direction of height downwards, the clamping element is automatically clamped on the battery box. Therefore, special latching mechanisms for fixing the position of the clamping element on the battery box are not required. At the same time, the construction according to the disclosure provides in particular also an automatic tolerance compensation. For reasons of production, both the fastening edges provided by the battery box and the respective associated peripheral edges of the clamping element cannot always be formed exactly identical with respect to their geometric configuration. This, however, does not play a role for an appropriate arrangement and positive fixing of the position of the clamping element on the battery box, as the appropriate firm fit of the clamping element on the battery box is ultimately ensured by the fact that the clamping element is moved in direction of height correspondingly far down to its end position. To that extent, any tolerances in the geometric configuration can be compensated by pushing the clamping element in the direction of height correspondingly further down or less far down in relation to the battery box.

If, as a result of appropriate use of the battery box, the interior pressure prevailing in the battery box should increase, the end walls will tend to buckle respectively as a consequence. By the "inclined plane" provided by the disclosure between the fastening edges designed in an inclined manner on the one hand and the associated peripheral edges of the clamping element, on the other hand, it is ensured that the clamping element rests firmly against the battery box, so that a corresponding force is introduced via the clamping elements into the side walls. Therefore, the internal pressure of the battery box acting upon the end walls can be absorbed via the clamping elements, namely by introducing force into the side walls. The end walls are thus prevented from buckling.

If, however, there is a pressure decrease inside the battery box, the fit of the clamping elements on the battery box may loosen. Following the weight, the clamping elements will automatically move in the direction of height downward, so that a firm fit of the clamping elements on the battery box is ensured again. The embodiment according to the disclosure makes it possible, unlike all constructions known from the prior art, that the clamping elements can move up, which takes the possibly dynamic loads on the battery box under operating conditions into account in an advantageous manner in such a way that a firm fit of the clamps is always ensured, with the consequence that an unwanted buckling of the end walls is securely prevented.

The fastening edges may be formed by forming corresponding grooves in the base body of the battery box. Alternatively, however, the fastening edges may also be formed by applying corresponding applications to the exterior of the side walls of the battery box. This permits even already existing battery boxes to be retrofitted. This is not possible with constructions known from the prior art. In addition, constructions known from the prior art do not permit the tolerance compensation already described above. Thus, the embodiment according to the disclosure provides in a synergetic manner a possibility for tolerance compensation while ensuring simultaneously that the end walls are appropriately supported, in particular during a pressure drop, while at the same time it provides the possibility to equip already existing boxes in terms of retrofitting according to the disclosure.

Further areas of applicability will become apparent from the description provided herein. The description and specific examples in this summary are intended for purposes of illustration only and are not intended to limit the scope of the pre-sent disclosure.

DRAWINGS

The drawings described herein are for illustrative purposes only of selected embodiments and not all possible implementations, and are not intended to limit the scope of the present disclosure.

Other features and advantages of the disclosure can be gathered from the following description on the basis of the figures. In these figures:

FIG. 1 shows a schematic perspective representation of a battery box according to the disclosure;

FIG. 2 shows a schematic side view of the base body of the battery box according to FIG. 1;

FIG. 3 shows the base body of the battery box according to FIG. 1 in a partial top view from above; and FIG. 4 shows a perspective view of a clamping element according to the disclosure.

Corresponding reference numerals indicate corresponding parts throughout the several views of the drawings.

DETAILED DESCRIPTION

Example embodiments will now be described more fully with reference to the accompanying drawings.

In the figures, identical elements are identified by the same reference numerals.

FIG. 1 shows a battery box 1 which, in the exemplary embodiment shown, is filled with corresponding battery cells. The battery box includes a base body 2 with end walls 3 and side walls 4. These are interconnected so as to form corner edges 5. At a distance from corner edge 5, a fastening edge 6 is formed which extends at an angle to the corner edge. On the upper side, the base body is configured to be closed by a cover 11.

Clamping elements 7 with side legs 8 on which end edges 9 (cf. FIG. 4) are formed can thus be pushed onto the sides of the battery box 1, in that the end edges 9 engage behind the fastening edges 6. When the clamping element 7 is displaced further relative to the base body 2, the latter will be increasingly braced and will rest against end wall 3 with great force. In order to improve its mechanical properties, stiffening elements 10 are provided.

It is obvious that the clamping element 7 always gets shaken firmly into place by gravity alone. Moreover, it will be possible to fix it further for instance with changes in the end wall area.

In FIG. 2, the base body 2 of the battery box 1 according to the disclosure can be recognised in a schematic side view. As can be seen from this representation, the respective corner edges 5 formed between the end walls 3 and the side walls 4 extend vertically in relation to the drawing level according to FIG. 2, i. e. in direction of height 13 starting from the bottom of the base body 2 upwards. The respective fastening edge 6 assigned to a corner edge 5 is angled with respect to the respective associated corner edge 5, i. e. formed extending in an inclined manner with respect to it, so that a kind of "inclined plane" is provided by the respective fastening edge 6 in relation to the associated corner edge 5. The angular deflection of the fastening edge 6 with respect to the associated corner edge 5 is configured such that the distance between the fastening edge 6 and the corner edge 5 increases in direction of height 13 downwards. Therefore, this results in an arrangement according to which the fastening edge 6 is arranged at a further distance from the associated corner edge 5 in the area of the bottom of the base body 2 than in the area of the upper end edge, i. e. the edge of base body 2 near the cover.

As can be gathered in particular from the representation in FIG. 3, the fastening edge 6 is formed integrally with the base body 2. In the exemplary embodiment shown, this is achieved in that the wall thickness of the battery box 2 is thicker in the area of the respective end walls 3 than with respect to the side walls 4. This permits a design of fastening edges 6 which, starting from the respective associated corner edge 5, form an undercut. In finally assembled condition, this undercut is engaged behind by the respective associated end or peripheral edge 9 of the clamping element 7, as shown in FIG. 1.

Alternatively to the embodiment shown, it may also be provided that a corresponding groove for forming a fastening edge 6 is introduced into the base body 2 of the battery box 1. Alternatively, it is also possible to form a fastening edge 6 in that on the outside of the side wall, the base body 2 is equipped with a web, a sheet-metal or plastic strip and/or the like which then provides the fastening edge 6.

In FIG. 4, a clamping element 7 can be seen in a schematic perspective representation. As can be gathered in particular from this figure, the clamping element 7 comprises a front section 12 which, in finally assembled condition, rests against the associated end wall 3 of base body 2, as can already be gathered from FIG. 1.

The clamping element 7 is entirely configured to be U-shaped. For this purpose, two side legs 8 are provided which are arranged on the end side of front section 12. It is preferred that the clamping element 7 is configured integrally from one sheet-metal part. This may be formed in one step by die-cutting and folding back.

As can be seen from the representation in FIG. 4, the end edges 9 of clamping element 7 which are associated to the fastening edges 6 in finally assembled condition extend in an inclined manner with respect to the respective connecting edge between front section 12 and the respective associated side leg 8. The angled design of the end edges 9 is configured in correspondence to the angled design of the associated fastening edges 6 of base body 2.

The end edges 9 are preferably formed in that the end area of the side legs 8, which end area is facing away from the front section 12, is designed folded back.

In the embodiment shown, the front section 12 is designed with stiffening elements 10. These stiffening elements, as represented in the embodiment shown, may be ribs. Also imaginable, however, are beads. Also the side legs 8 may be equipped with corresponding stiffening elements 10 which, however, is not shown in the figures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A battery box for a block battery for receiving at least one battery cell having electrode plates, said battery box comprising a base body which is made of plastic material and has two end walls which extend substantially in parallel with the electrode plates, and two side walls which extend substantially at a right angle to said end walls, the end walls and side walls each having a top edge and a bottom edge and being interconnected so as to form a corner edge, wherein the side walls comprise a fastening edge on their outer surface, which fastening edge extends in an angled manner with respect to corner edge, wherein the fastening edge is formed such that, viewed from the corner edge, it can be engaged behind, wherein in the area of the top edge of side wall, the fastening edge is arranged closer to the corner edge than in the area of the bottom edge of side wall, wherein the fastening edge extends continuously from the top edge to the bottom edge, and wherein the battery box comprises a clamping element which comprises an area resting against an end wall, and moulded thereon two areas, each resting against a side wall and having one free end each, and on each of the free ends a folded edge, which folded edges engage behind the fastening edge.

2. The battery box according to claim 1, wherein the fastening edge is formed by an edge in the side wall material.

3. The battery box according to claim 1, wherein the fastening edge is formed by a moulded plate placed thereon.

4. The battery box according to claim 1, wherein the clamping element is made of metal.

5. The battery box according to claim 1, wherein the clamping element comprises stiffening ribs.

6. The battery box according to claim 1, wherein the free ends of the clamping element are inclined such that they extend in the same manner as the fastening edges.

* * * * *